(12) United States Patent
Wang et al.

(10) Patent No.: US 6,302,415 B1
(45) Date of Patent: Oct. 16, 2001

(54) SKATEBOARD FOOT BRAKE

(76) Inventors: Leao Wang; Peter Wu, both of No. 1, Lane 233, Sec. 2, Charng Long Rd., Taiping 411 (TW)

( * ) Notice: Subject to any disclaimer, the term of this patent is extended or adjusted under 35 U.S.C. 154(b) by 0 days.

(21) Appl. No.: 09/517,333

(22) Filed: Mar. 2, 2000

(51) Int. Cl.$^7$ ................................................ A63C 17/04
(52) U.S. Cl. ..................... 280/87.041; 280/11.27
(58) Field of Search ............................. 280/14.27, 14.28, 280/87.041, 11.211, 11.215, 264

(56) References Cited

U.S. PATENT DOCUMENTS

| | | | | |
|---|---|---|---|---|
| 1,614,822 | * | 1/1927 | Bukolt | 280/87.041 |
| 1,701,410 | * | 2/1929 | Hornquist | 280/87.041 |
| 4,123,079 | * | 10/1978 | Biskup | 280/87.042 |
| 4,394,029 | * | 7/1983 | Holmgren | 280/87.041 |
| 4,799,701 | * | 1/1989 | Lindau et al. | 280/87.041 |
| 5,927,733 | * | 7/1999 | Banda | 280/87.041 |
| 6,139,035 | * | 10/2000 | Tsai | 280/87.041 |

* cited by examiner

Primary Examiner—Brian L. Johnson
Assistant Examiner—Elaine Gort
(74) Attorney, Agent, or Firm—Dougherty & Troxell; Kuo-Hsiung Chiu

(57) ABSTRACT

A skateboard having a front supporting bar, a front wheel assembly, a main shaft, a deck, a rear wheel assembly, and a deck fastened on the main shaft, a tail of the deck being raised above and covering the top of the rear wheel assembly. The deck has a resilient section near the rear wheel assembly so that the user can exert a force with his heels to enable the tail of the deck to be sloping with the resilient section serving as pivot. Accordingly, the bottom of the tail of the deck is in contact with the surface of the rear wheels to achieve a braking effect.

2 Claims, 4 Drawing Sheets

SKATEBOARD FOOT BRAKE

BACKGROUND OF THE INVENTION

1. Field of the Invention

The present invention relates to an improvement of a skateboard, and more particularly to a skateboard which has a bending device at the rear end of the deck thereof so that the user can make use of a skill to exert a force with a single foot to achieve a braking effect.

2. Description of the Prior Art

A conventional skateboard, as shown in FIG. 4, primarily includes a front supporting bar 11 with a handgrip 10, a front wheel assembly 12, a rear wheel assembly 13 and a deck 14. The bottom end of the front supporting bar 11 is coupled with the front wheel assembly 12 while a braking pad 15 is mounted at the rear side of the deck 14 and above the rear wheel assembly 13. The user can use one foot to press the braking pad 15 which is then in contact with the rear wheel assembly 13 to produce an expected braking effect.

Although the foregoing design can exactly reach the braking effect, the user has to place one foot upon the deck 14 to perform the skating motion. Consequently, in braking, the user has to try to use this foot to keep the balance of the center of gravity of the body while the other foot performs the braking motion. In other words, the user must have an excellent skill to command this kind of the skateboard so that it's difficult for beginners.

Moreover, the two feet of the user stand upon the skateboard in performing the braking procedure, that is, one foot is situated on the deck 14 while the other foot is located on the braking pad 15. In addition that it's difficult to maintain the center of gravity, the body is potentially endangered with the motion of the skateboard.

SUMMARY OF THE INVENTION

It is the main object of the present invention to provide a skateboard in which the rotary design of the deck can be used for the user to perform the skating and braking procedure with single foot while the other foot can be used to keep the center of gravity of the body. Accordingly, the safety in using is enhanced.

BRIEF DESCRIPTION OF THE DRAWINGS

The drawings disclose illustrative an embodiment of the present invention which serves to exemplify the various advantages and objects hereof, and are as follows.

DETAILED DESCRIPTION OF THE PREFERRED EMBODIMENT

Figure 1:
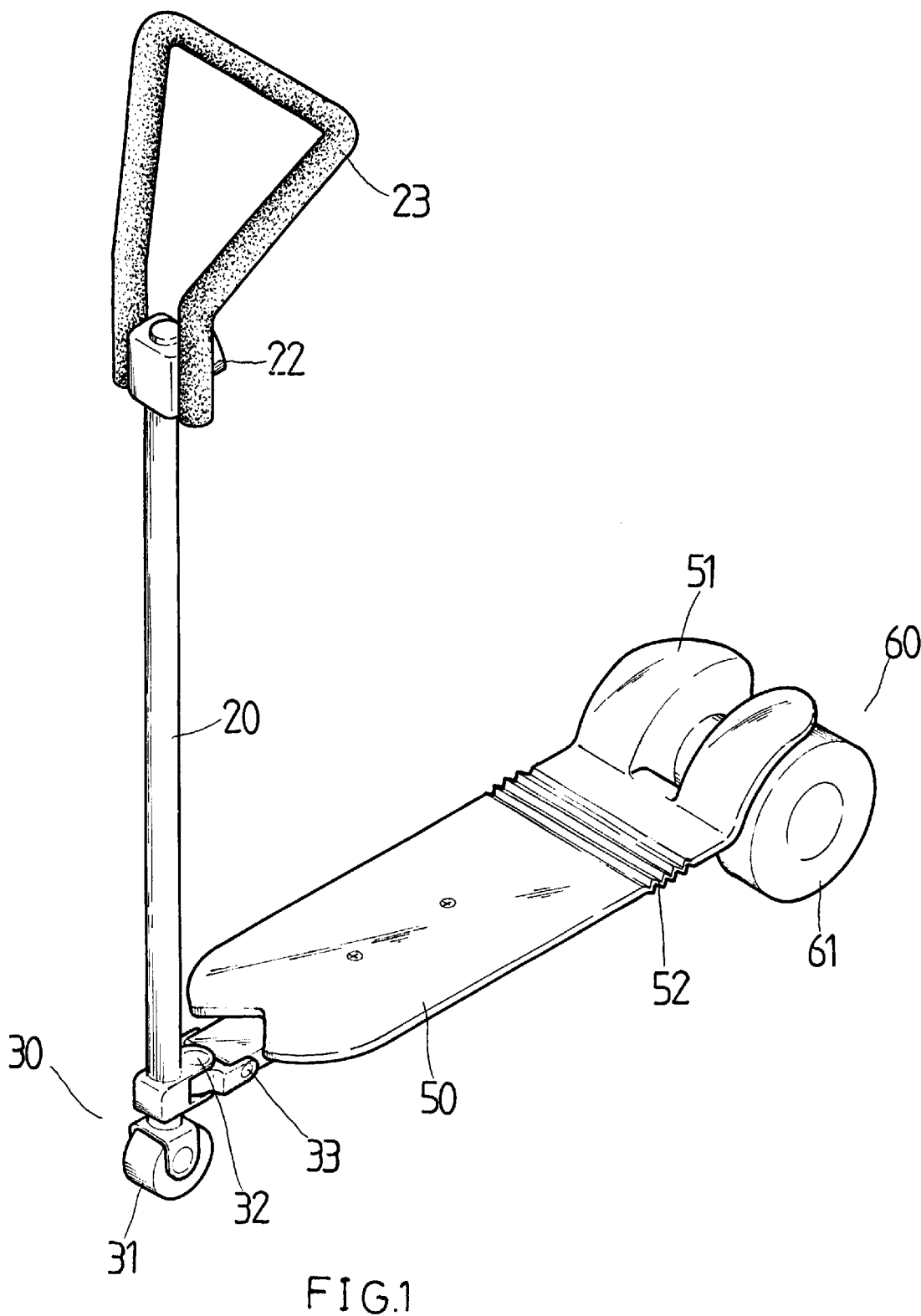
FIG. 1 is a perspective assembly view of the present invention.
Figure 2:
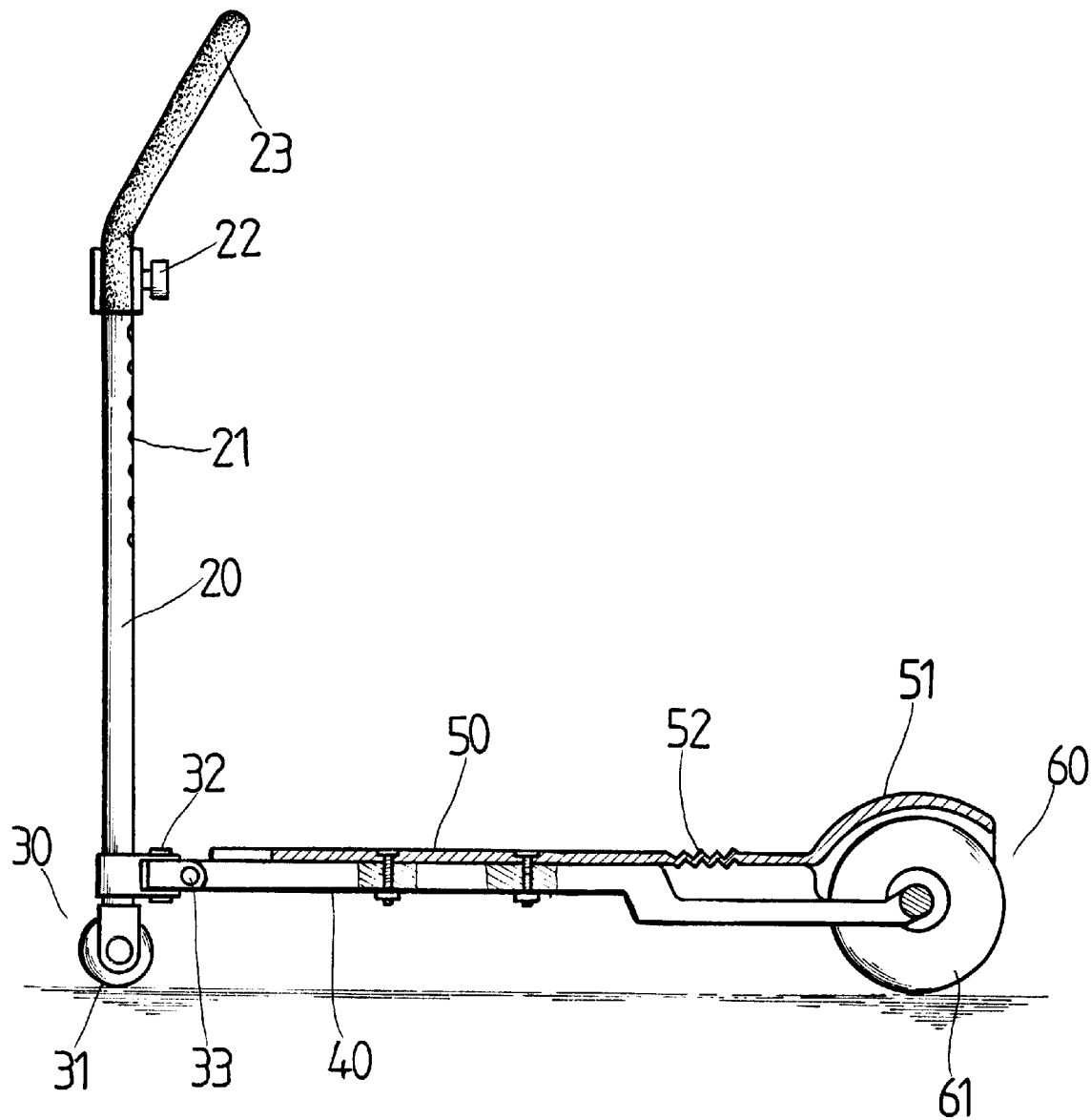
FIG. 2 is a side view of the present invention after assembly.

First of all, the skateboard in accordance with the present invention, as shown in FIGS. 1 and 2, includes the following basic components:

a front supporting bar 20 having a plurality of through holes 21 for fastening a handle 23 and adjusting the height thereof in cooperation with a knob 22, a front wheel assembly 30 being coupled at the bottom end thereof;

a front wheel assembly 30 having a front wheel 31, a first pivot 32 and a second pivot 33, said second pivot 33 and a main shaft 40 being hinged together;

a main shaft 40 being attached with a rear wheel assembly 60 at the end thereof;

a deck 50 fastened upon said main shaft 40, a tail 51 of said deck 50 being raised and covering the top of said rear wheel assembly 60, a proper clearance being kept between said tail 51 and said rear wheels 61, said deck 50 having a resilient section 52 near said rear wheel assembly 60; and a rear wheel assembly 60 connected at the end of said main shaft 40.

Figure 3:
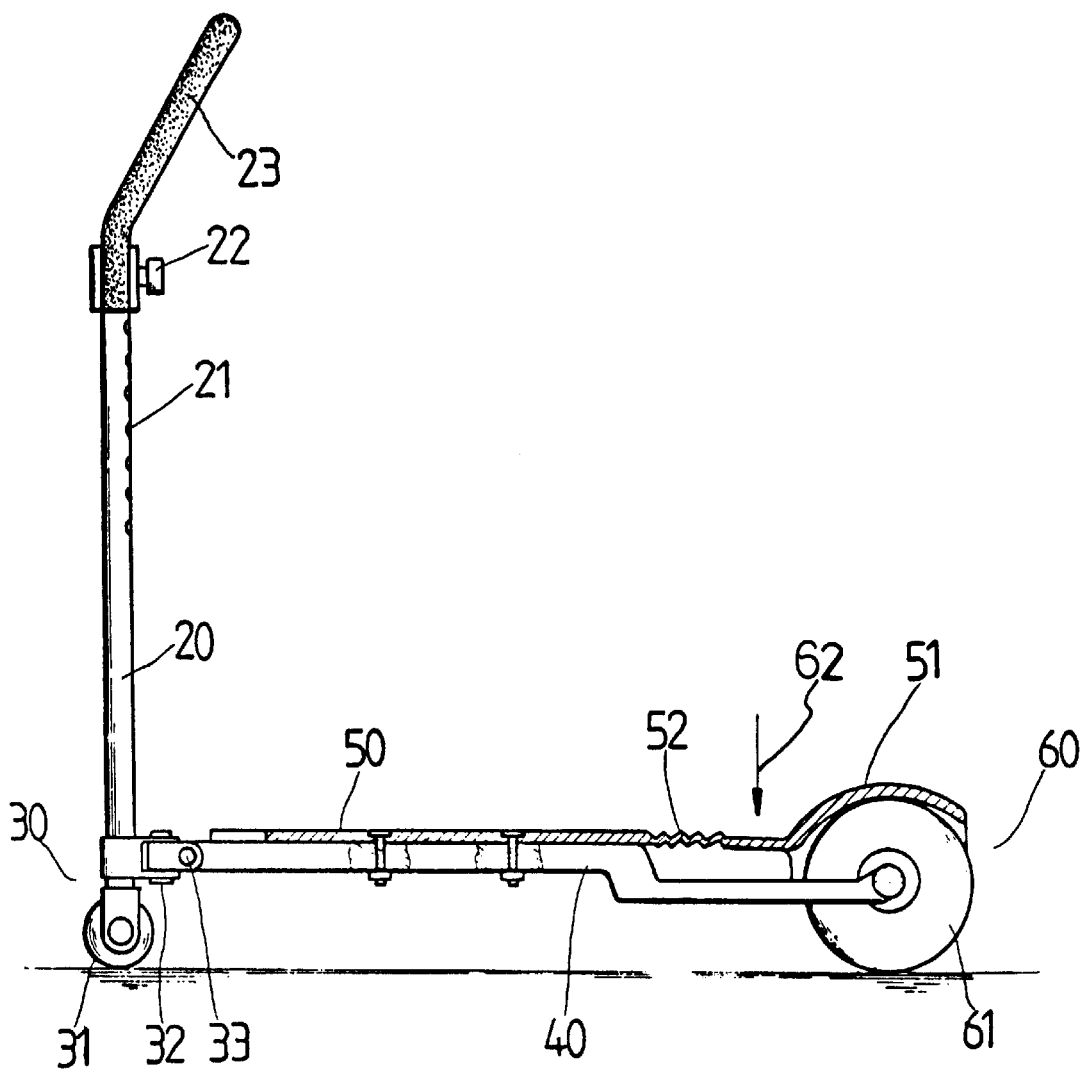
FIG. 3 is a schematic drawing of the action of the present invention.
Figure 4:
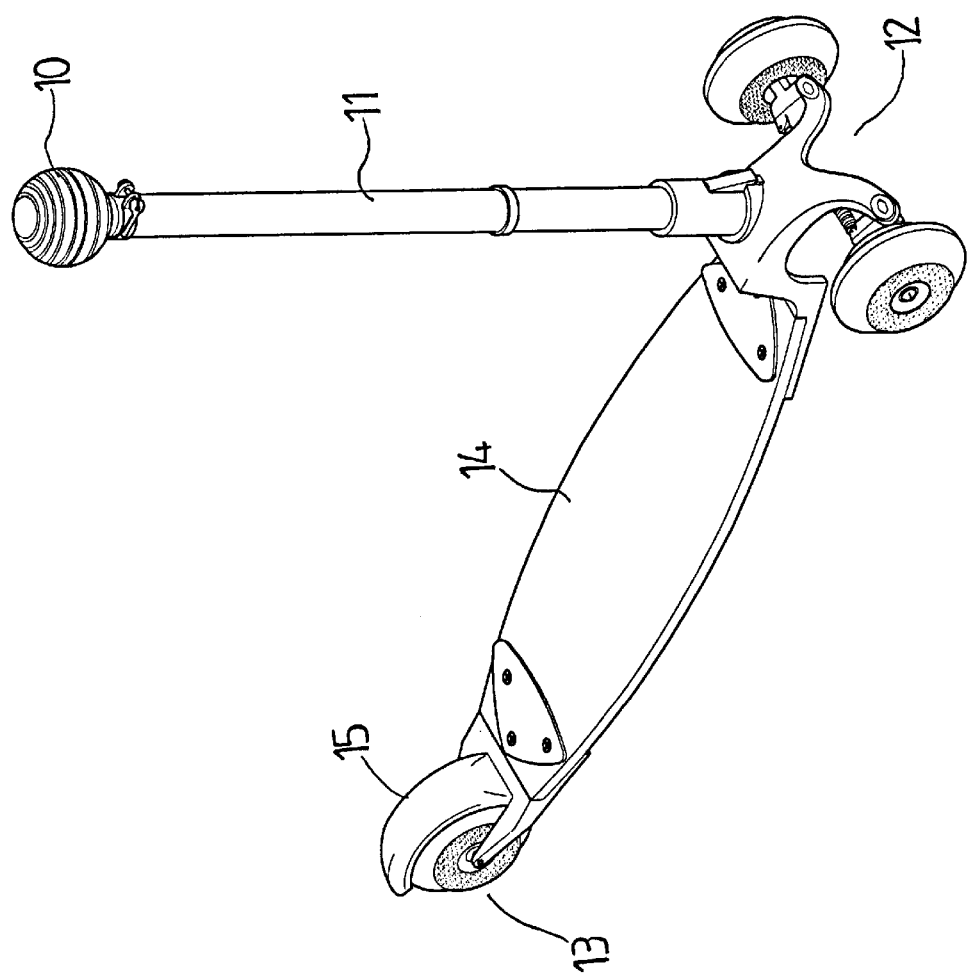
FIG. 4 is a perspective view of a conventional skateboard after assembly.

After assembly of the foregoing components, the user only has to place his feet on the deck 50 for skating. In braking, it's only required for the user to make use of a skill to exert a, at arrow 62, with his heels to enable the tail 51 of the deck 50 to be sloping by means of the resilient section 52 serving as pivot. Thereafter, the bottom end of the tail 51 of the deck 50 is in contact with the surface of the rear wheels 61, as shown in FIG. 3, to achieve a braking effect by means of the friction property.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claim.

What is claimed is:

1. A skateboard having a foot brake and comprising:

a) a main shaft having a front portion and a rear portion having a rear wheel assembly mounted to the rear portion;

b) a front supporting bar mounted on the front portion of the main shaft and having a front wheel connected thereto; and c) a deck fastened to the main shaft, the deck having: a planar front deck portion; a tail including a raised portion normally spaced from and extending over a portion of a circumference of the rear wheel and a section co-planar with the front deck portion; and a resilient portion between the front deck portion and the tail, the resilient portion comprising a plurality of corrugations extending across a width of the deck, whereby a force exerted on the tail deflects the raised portion about the resilient corrugations into contact with the rear wheel to provide a braking effect.

2. The skateboard having a foot brake of claim 1 wherein the tail and the resilient portion are formed integrally with the front deck portion.

* * * * *